(12) United States Patent
Stranges

(10) Patent No.: US 8,335,523 B2
(45) Date of Patent: Dec. 18, 2012

(54) ELECTRONIC ENTITY AND MICROCIRCUIT CARD FOR ELECTRONIC ENTITY

(75) Inventor: Lorenzo Stranges, Neuilly sur Seine (FR)

(73) Assignee: Oberthur Technologies, Levallois-Perret (FR)

( * ) Notice: Subject to any disclaimer, the term of this patent is extended or adjusted under 35 U.S.C. 154(b) by 26 days.

(21) Appl. No.: 12/814,758

(22) Filed: Jun. 14, 2010

(65) Prior Publication Data

US 2010/0317369 A1    Dec. 16, 2010

(30) Foreign Application Priority Data

Jun. 15, 2009   (FR) ...................................... 09 53995

(51) Int. Cl.
*H04W 88/02* (2009.01)
(52) U.S. Cl. .................................................. 455/456.3
(58) Field of Classification Search ............... 455/456.2, 455/456.3, 456.1, 404.2, 457; 235/492; 709/224; 701/201, 101, 407, 408, 412, 469, 533; 342/357.3, 342/357.2, 357.62; 375/147
See application file for complete search history.

(56) References Cited

U.S. PATENT DOCUMENTS

| | | | |
|---|---|---|---|
| 7,480,514 B2 | 1/2009 | Karaoguz et al. | |
| 2002/0037744 A1 | 3/2002 | Bhatia et al. | |
| 2002/0103911 A1 | 8/2002 | Meifu et al. | |
| 2002/0140745 A1 | 10/2002 | Ellenby et al. | |
| 2003/0069693 A1 | 4/2003 | Snapp et al. | |
| 2005/0162523 A1 | 7/2005 | Darrell et al. | |
| 2007/0006098 A1 | 1/2007 | Krumm et al. | |
| 2007/0297028 A1 | 12/2007 | Wulff et al. | |
| 2009/0049004 A1 | 2/2009 | Nurminen et al. | |
| 2009/0054077 A1 | 2/2009 | Gauthier et al. | |
| 2010/0323730 A1* | 12/2010 | Karmarkar | 455/466 |
| 2011/0014933 A1* | 1/2011 | Karmarkar et al. | 455/466 |
| 2011/0034179 A1* | 2/2011 | David et al. | 455/456.1 |

FOREIGN PATENT DOCUMENTS

| | | |
|---|---|---|
| EP | 1 617 629 A1 | 1/2006 |
| EP | 1 857 944 A1 | 11/2007 |

OTHER PUBLICATIONS

French Search Report, dated Jan. 29, 2010, from corresponding French application.

* cited by examiner

*Primary Examiner* — Diane Mizrahi
(74) *Attorney, Agent, or Firm* — Young & Thompson

(57) ABSTRACT

An electronic entity and a microcircuit card that obtains an orientation of the electronic entity, sends a request containing information on the orientation, receives information relating to a positional entity linked to both a geographical position of the electronic entity and the orientation, and provides a user with information relating to the positional entity.

14 Claims, 2 Drawing Sheets

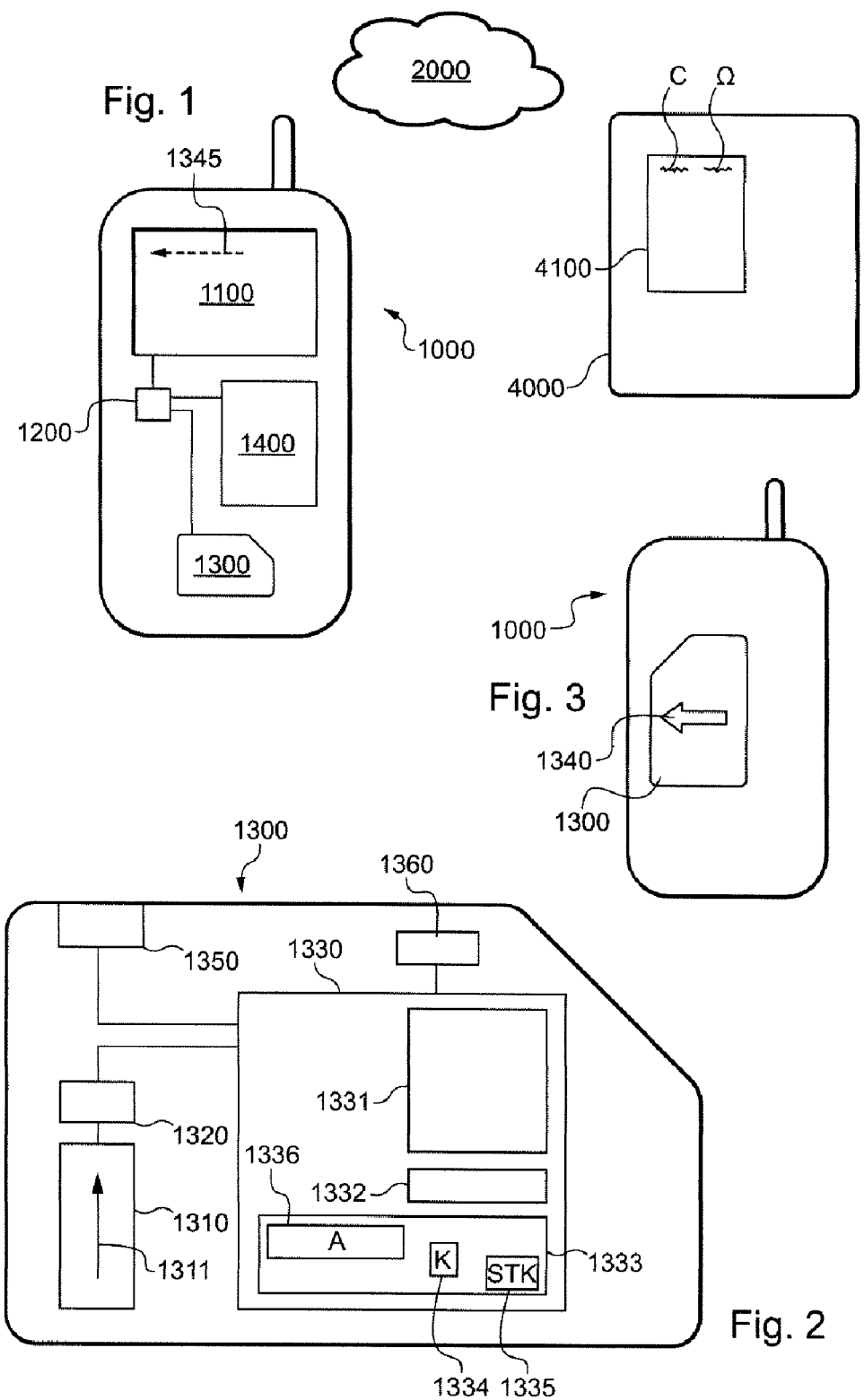

ELECTRONIC ENTITY AND MICROCIRCUIT CARD FOR ELECTRONIC ENTITY

The invention concerns an electronic entity and a microcircuit card for an electronic entity, notably a portable electronic entity such as a mobile telephone or a personal digital assistant.

BACKGROUND OF THE INVENTION

There has been proposed, for example in the document US 2003/0069693, a geographical pointing device that includes a GPS receiver, a digital compass and a database. This device displays the position and the direction of the user on a map that includes points of interest. There is provision for enabling a user to point to an object to obtain an identification and characteristics of that object. However, this solution can be implemented only if the device includes the necessary elements (such as a compass and a database in the document referred to above).

SUMMARY OF THE INVENTION

The present invention aims to remedy these drawbacks.

To this end, a first aspect of the present invention provides an electronic entity characterized in that it comprises:
  means for obtaining the orientation of the electronic entity,
  means for sending a request containing information on said orientation,
  means for receiving information relating to at least one positional entity linked to the geographical position of the electronic entity and to said orientation, and
  means for providing a user with information relating to at least one positional entity received by the receiving means.

Thanks to these provisions, the electronic entity of the present invention can receive up-to-date information on at least one positional entity near the electronic entity and command the display of some or all of that information in order for the user of the electronic entity to be able to take note of it.

Note that the server which responds to the request by sending information relating to at least one positional entity receives position information for the electronic entity with the request. This information may be provided by a microcircuit card integrated into the electronic entity (which card then includes a signal receiver and triangulation means, for example), by the electronic entity (which then includes a signal receiver and triangulation means, for example), or by a telecommunication network, for example a mobile telecommunication network (which then transmits the identification of the cell in which the electronic entity is situated or the powers of signals received from the electronic entity via different antennas, for example, triangulation being effected by this network or by the server concerned).

According to particular features, the electronic entity of the present invention, as succinctly described hereinabove, further includes means for obtaining the geographical position, the means for sending a request being adapted so that said request contains information on said geographical position.

The means for obtaining the geographical position may comprise means for obtaining location information for the electronic entity, for example location information for a cell in a mobile telephone network via which said electronic entity is communicating or for a plurality of cells from which the electronic entity receives the signals and determines its position by triangulation, which is of particular benefit if the electronic entity is a mobile telephone.

According to particular features, said means for obtaining the geographical position include means for receiving positioning signals and means for determining geographical locations as a function of said positioning signals.

The geographical position information is obtained by means of a GPS type system, for example.

According to particular features, said means for obtaining the geographical position include means for obtaining a reference of a cell of the cellular telephone network in which the electronic entity is situated.

According to particular features, said means for obtaining the orientation of the electronic entity include a magnetometer.

A magnetometer makes it possible to determine the direction of magnetic north that serves as a reference direction relative to which the orientation of the electronic entity is determined.

Means may also be provided for commanding the display on a screen of the electronic entity of a message prompting the user to place the electronic entity in a particular position appropriate for measuring its orientation.

The electronic entity of one embodiment of the present invention includes a microcircuit card, means for sending information indicating the model of the electronic entity and means for receiving data representing the relative orientation of the electronic entity and the microcircuit card for said model, the means for obtaining the orientation of the electronic entity using said relative orientation.

Thus the relative orientation of the microcircuit card and the electronic entity is determined automatically.

The electronic entity is a mobile telephone, for example.

The electronic entity of one embodiment of the invention includes a microcircuit card, means for accessing a SimToolKit menu of said microcircuit card and means for selecting in said menu an application for controlling the means for obtaining the orientation, the means for sending the request, the means for receiving information relating to at least one positional entity and the means for supplying a user with information relating to at least one positional entity.

According to particular features, the electronic entity includes a microcircuit card, the means for obtaining the orientation of the electronic entity being adapted to determine a relative orientation of the microcircuit card and the electronic entity on first using the microcircuit card or first launching an application for controlling the means for obtaining the orientation, the means for sending the request, the means for receiving information relating to at least one positional entity and the means for providing a user with information relating to at least one positional entity.

In one embodiment, the means for providing a user with information relating to at least one positional entity received by the receiving means are adapted to display at least one hypertext link and to enable the user to select that link to obtain additional information relating to a positional entity.

A second aspect of the present invention provides a microcircuit card for fitting to an electronic entity, characterized in that it comprises:
  means for obtaining the orientation of the electronic entity,
  means for sending a request containing information on said orientation,
  means for receiving information relating to at least one positional entity linked to the geographical position of the electronic entity and to said orientation, and
  means for providing a user with information relating to at least one positional entity received by the receiving means.

Accordingly, the electronic entity can indicate at least one positional entity as soon as it is fitted with the microcircuit card (for example by inserting the latter card into a housing provided for this purpose), without the electronic entity itself incorporating means necessary for determining its orientation.

In some embodiments, the microcircuit card includes means for communicating to the user of the electronic entity a reference orientation, the means for obtaining the orientation of the electronic entity being adapted to determine the orientation of the electronic entity relative to said reference orientation.

In some embodiments, the microcircuit card has a face carrying a visual indication of a reference direction associated with the means for obtaining the orientation.

Thanks to each of these provisions, the user can identify which part of the microcircuit card and therefore of the electronic entity he must orient toward the positional entity of interest to obtain information concerning that positional entity.

A third aspect of the present invention provides an electronic data processing system that comprises:

means for receiving a request containing information on the orientation of an electronic entity, means for receiving information on the geographical position of said electronic entity, means for determining information relating to at least one positional entity linked to the geographical position of the electronic entity and to said orientation, and means for responding to said request by sending said information relating to at least one positional entity.

According to particular features, the determination means are adapted to determine information relating to at least one billboard and to the advertisement displayed on said billboard.

A fourth aspect of the present invention provides a method of providing information relating to positional entities characterized in that it comprises:

a step of an electronic entity obtaining the orientation of the electronic entity, a step of the electronic entity sending a request containing information on said orientation, a step of the electronic entity receiving information relating to at least one positional entity linked to the geographical position of the electronic entity and to said orientation, and a step of the electronic entity supplying a user with information relating to at least one positional entity received by the receiving means.

The respective advantages, aims and particular features of the microcircuit card, the electronic data processing system and the method of the second, third and fourth aspects of the present invention being similar to those of the electronic entity of the first aspect of the present invention, they are not repeated here.

It is not possible at present for any telephone user to point to an object to obtain an identification and characteristics of that object. Some aspects of the present invention seek also to remedy these drawbacks.

To this end, a fifth aspect of the present invention provides a microcircuit card to be fitted to an electronic entity, characterized in that it comprises:

means for obtaining the orientation of the microcircuit card, means for obtaining information on at least one positional entity as a function of said orientation, and means for providing a user with information relating to at least one positional entity obtained.

Accordingly, the electronic entity can indicate at least one positional entity provided that it is fitted with the microcircuit card (for example by inserting the latter card into a housing provided for this purpose) of the fifth aspect of the present invention, without the electronic entity itself incorporating the means necessary for determining its orientation.

According to particular features, the means for obtaining information on positional entities include:

means for sending a request containing information on said orientation, and means for receiving information relating to at least one positional entity linked to the geographical position of the microcircuit card and to said orientation.

The advantages of these provisions, including those of the electronic entity of the first aspect of the present invention, are not repeated here.

According to particular features, the microcircuit card of the present invention, as succinctly described hereinabove, further includes means for obtaining the geographical position of said microcircuit card, the means for sending a request being adapted so that said request contains information on the geographical position of the microcircuit card.

The means for obtaining this position may comprise means for obtaining information on the location of the microcircuit card (and thus of the electronic entity). This information is for example information on the location of a cell via which the electronic entity is communicating in a mobile telephone network, which is of particular benefit when the electronic entity is a mobile telephone.

According to particular features, said means for obtaining the geographical position includes means for receiving positioning signals and means for determining a geographical location as a function of said positioning signals.

The geographical position information is obtained by means of a GPS type system, for example.

According to particular features, said means for obtaining the orientation of the microcircuit card include a magnetometer.

A magnetometer makes it possible to determine the direction of magnetic north that serves as a reference direction relative to which the orientation of the microcircuit card is determined.

There can further be provided means able to command the display on a screen of the electronic entity of a message to the user prompting them to place the electronic entity in a particular position appropriate for measuring the orientation of the microcircuit card.

In one embodiment that can be envisaged, for example, the microcircuit card has a face featuring a visual indication (such as an arrow printed on that face) of a reference direction associated with the orientation obtaining means. This makes it possible to align the microcircuit card (typically the visual indication that it features) with the positional entity without having to take account of the relative orientation of the microcircuit card and the electronic entity.

In another embodiment, the microcircuit card may equally include means for sending information indicating the electronic entity model and means for receiving data representing the relative orientation of the electronic entity and the microcircuit card for that model. The microcircuit card can then command the production (or reproduction) of the indicator signal taking account of this relative orientation.

The microcircuit card is a mobile telephone network identification card (SIM or USIM), for example.

In practice, the means for providing information may in particular be adapted to emit a command (such as a "SIM TOOLKIT" type command) to generate a signal sent to the microprocessor of the electronic entity.

A sixth aspect of the present invention provides an electronic entity fitted with a microcircuit card as succinctly described hereinabove.

A seventh aspect of the present invention provides a method of providing information relating to positional entities characterized in that it comprises:
- a step of a microcircuit card obtaining the orientation of said microcircuit card,
- a step of obtaining information on at least one positional entity as a function of said orientation, and
- a step of the microcircuit card providing a user with information relating to at least one positional entity obtained during the step of obtaining information.

Other advantages, objects and particular features of the microcircuit card, the electronic entity and the method of the fifth to seventh aspects of the present invention, respectively, being similar to those of the electronic entity and the microcircuit card of the first two aspects of the present invention, they are not repeated here.

BRIEF DESCRIPTION OF THE DRAWINGS

Other advantages, objects and features of the present invention will become apparent in the light of the following description, which is given with reference to the appended drawings, in which:

FIG. 1 represents a system including a mobile telephone fitted with a microcircuit card conforming to the teachings of the invention;

FIG. 2 is a diagrammatic representation of this microcircuit card;

FIG. 3 represents one possibility that may be envisaged for determining the relative orientation of the microcircuit card and the mobile telephone.

DETAILED DESCRIPTION OF THE PREFERRED EMBODIMENTS

Figure 4:
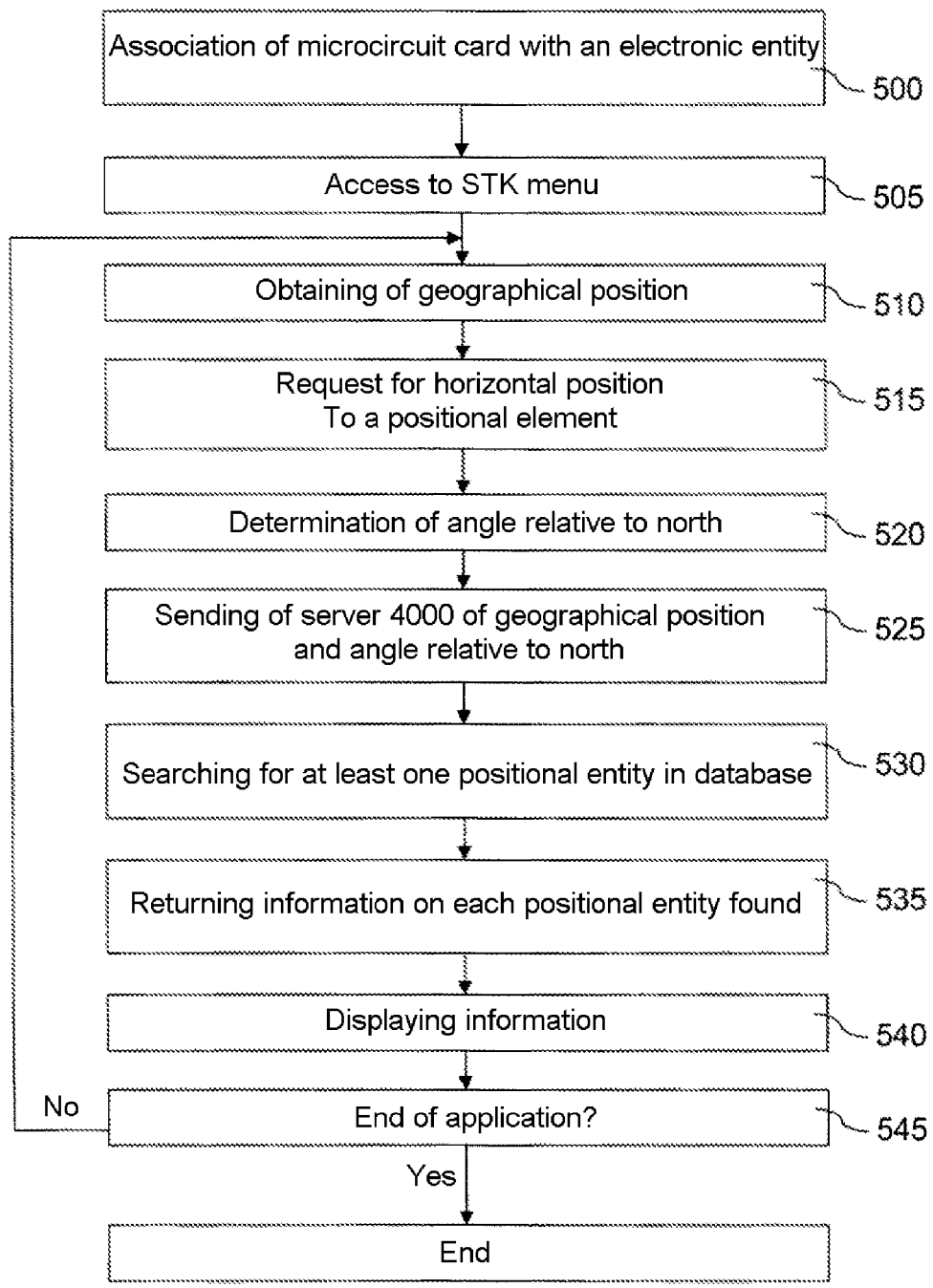
FIG. 4 represents in flowchart form steps of one particular embodiment of the method of the present invention.

In the following description, embodiments of the present invention are described in detail in which the principal means and the principal steps implementing the inventive concept of the present invention are incorporated into and executed by a microcircuit card of an electronic entity. However, the present invention is not limited to this architecture. In particular, in embodiments (not shown) that will be evident to the person skilled in the art on the basis of the description to be given hereinafter, an electronic entity may include at least some of these main means and execute at least some of these main steps independently of a microcircuit card. In other embodiments (also not shown), this electronic entity may either include no microcircuit card or include a microcircuit card of a type known in the art.

The mobile telephone from FIG. 1 comprises a microprocessor 1200 able notably to display messages to the user on a screen 1100 and to receive instructions from the user via a keypad 1400.

The mobile telephone 1000 receives, for example removably in a housing provided for this purpose, a microcircuit card 1300 that is connected to the microprocessor 1200 via contacts of the microcircuit card 1300 in order to interact with the latter.

The microcircuit card 1300 is a mobile telephone network 2000 identification card (for example a SIM (Subscriber Identity Module) or USIM (Universal Subscriber Identity Module) card enabling the user of the mobile telephone 1000 to be identified (generally the user is a subscriber to the mobile telephone network 2000) and thus to be authorized by the mobile telephone network 2000 to exchange data via the mobile telephone network 2000 (notably via communication means, not shown, with which the mobile telephone 1000 is equipped). This data represents voice signals when the mobile telephone 1000 is used to dialog with a remote user or consists of other types of data, such as a message, an image file or data required for the operation of the mobile telephone 1000 (see below).

The mobile telephone network 2000 is a cellular type network in which the area covered by the network is divided into cells; a relay-antenna of the mobile telephone network 2000 is associated with each cell so that the mobile telephone 1000 has access to the mobile telephone network 2000 via the relay antenna associated with the cell in which the mobile telephone 1000 is situated.

The mobile telephone 1000 can notably exchange data with a remote server 4000 implementing the HyperText Transfer Protocol (http) or a Short Message Service (SMS) protocol for exchanging short messages. The remote server hosts a database 4100 accessible via the Internet or via SMS. The database 4100 preferably holds a plan representing points of interest called positional entities and associated information. The positional entities are, for example, buildings, monuments, trees, rivers, lakes, mountains, islands and, more generally, immobile objects. The information relating to the positional entities may include, for example, a postal address, geographical coordinates, a type (hospital, billboard, etc.), an Internet address in the form of a URL (Uniform Resource Locator) that can provide additional information on the positional entity, or links to other databases. The information in the database 4100 associated with the positional entities may also include photographs, names of companies or organizations, opening times, resources (parking spaces, hotels, restaurants, etc.), prices, promotional, sales or discount offers.

The database 4100 contains billboards (location and possibly size) and can provide information on the advertisement displayed. To update this advertisement, when the operator who changes the display arrives at a board, they use a portable device to connect to the server 4000 in a secure manner and update the information on the display and the associated information (content, text, etc.).

The server 4000 can store data such as the data of the file 4100 for a plurality of positional entities but sometimes in the present description, for simplicity, is limited to the situation of one positional entity.

Note that the server 4000 and the database 4100 may consist of systems implementing cartographic databases, for example Google Map or Mappy (Registered Trade Marks).

FIG. 2 is a diagrammatic representation of the elements of the microcircuit card 1300.

The microcircuit card 1300 comprises a processor 1330 which incorporates notably a read-only memory 1331 (for example storing instructions execution whereof by the processor 1330 enables notably the basic operation of the microcircuit card), a random-access memory 1332 (temporarily storing data used in the operation of the microcircuit card 1300), and a non-volatile rewritable memory 1333.

The non-volatile rewritable memory 1333 stores in particular:

a cryptographic key K 1334 for identifying the user to the mobile telephone network 2000, as already mentioned, an STK (SIM TOOLKIT) menu 1335 which is an application execution whereof enables the processor 1330 to command the microprocessor 1200 of the mobile telephone 1000 to display on the screen 1100 a menu showing the functions enabled by the microcircuit card 1300, and an application A 1336 providing information on positional entities, execution of which application implements the method described hereinafter.

As already mentioned, the microcircuit card 1300 has contacts 1350 through which the processor 1330 of the microcircuit card 1300 can dialog with and interact with the microprocessor 1200 of the mobile telephone 1000.

The microcircuit card 1300 also comprises a magnetometer 1310 produced in an MEMS (MicroElectroMechanical System) technology, for example, or an NEMS (NanoElectroMechanical System) technology, typically having a thickness between 400 μm and 500 μm, and a controller 1320 (for example an application-specific integrated circuit or ASIC), which receives signals sent by the magnetometer 1310 and consequently sends data to the processor 1330, for example data representing the orientation of the magnetometer 1310 relative to magnetic north (generally a preferred direction thereof as represented by an arrow 1311 in FIG. 2).

The microcircuit card 1300 includes a geographical location signal receiver 1360 able to determine the geographical position of the microcircuit card 1300 and thus of the mobile telephone 1000. For example, this receiver 1360 receives signals transmitted by satellites, for example satellites of the Global Positioning System (GPS) (Registered Trade Marks). Alternatively, the receiver 1360 receives signals from transmitters of the mobile telephone network capable of determining the position of the telephone 1000 by triangulation. The receiver 1360 is connected to the processor 1330.

Alternatively, and again by execution of the application A 1336, the processor 1330 obtains from its geographical location the reference of the cell C in which the mobile telephone 1000 is situated, for example by reading the file EF LOCI in the non-volatile rewritable memory 1333 of the microcircuit card 1300 or by sending an STK command, for example PROVIDE LOCAL INFO, to the microprocessor 1200 of the mobile telephone 1000, which must then send the processor 1330 the information relating to the reference of the cell C.

Steps of one particular embodiment of the method of the present invention are described hereinafter with reference to FIG. 4.

First of all, during a step 500, a microcircuit card 1300 of the present invention is associated with an electronic entity 1000. Typically, a SIM card is inserted into a housing provided for this purpose in a mobile telephone.

If the user of the mobile telephone 1000 wishes to obtain information on a positional entity, during a step 505, they access the STK menu 1335 of the microcircuit card 1300 (as by convention enabled by any mobile telephone fitted with such a card) and selects the application A 1336 in this STK menu 1335, which provokes execution of the application A 1336 and thus of the method as now described.

During a step 510, the application A 1336 obtains from the receiver 1336 the geographical position PG of the microcircuit card 1300 and thus of the mobile telephone 1000.

During a step 515, the processor 1330 then commands the microprocessor 1200 to display on the screen 1100 a message prompting the user to place the mobile telephone 1000 in a particular position (for example "flat"), typically such that the plane of the microcircuit card 1300 is at least approximately horizontal, which position enables the magnetometer 1310 to measure its orientation relative to magnetic north under good conditions.

With the mobile telephone in this position, the user then orients it relative to the positional entity of interest and confirms their request for information.

Then, by interacting with the controller 1320 during a step 520, the processor 1330 determines the angle at this time between the microcircuit card 1300 (and by deduction the mobile telephone 1000, as explained hereinafter) and magnetic north, either by reading data received periodically from the controller 1320 or by sending the controller 1320 a request to receive such data.

Note that the possibility of determining the orientation of the mobile telephone using the magnetometer 1310 in the microcircuit card 1300 assumes that the relative orientation of the mobile telephone 1000 and the microcircuit card 1300 has been defined beforehand.

To this end, the non-volatile rewritable memory 1333 may store data representing the relative orientation of the mobile telephone 1000 and the microcircuit card 1300, for example.

This data representing the relative orientation is obtained on first using the microcircuit card 1300 or on first launching the application A 1366, for example.

There may be provision for the microcircuit card 1300 on this occasion (and for example under the control of the application A 1336 on its first use) to prompt the user (by appropriate display on the screen 1100, for example by means of an STK command) to orient their mobile telephone 1000 (for example a specific part thereof) toward magnetic north (determined with the aid of a compass, for example) and to press a key of the keypad 1400.

Thus when the user presses the key the orientation measured by the magnetometer 1310 is transmitted to the processor 1330 and stored as relative orientation data (or reference data) in the non-volatile rewritable memory 1333 as an angle designating magnetic north sent by the controller 1320.

The orientation of the mobile telephone 1000 is then simple to deduce from the orientation of the magnetometer 1310 by a simple subtraction operation using this reference data.

Alternatively, the data representing the relative orientation can be determined as follows: the microcircuit card 1300 obtains from the mobile telephone 1000 information indicating the model of the mobile telephone 1000, sends this information to a dedicated server (for example the server 4000 mentioned above and possibly via the mobile telephone network 2000) storing for each telephone model data representing the relative orientation associated with that model. The dedicated server then sends in return data representing the relative orientation associated with the model of the mobile telephone 1000 to the microcircuit card 1300, which stores that data.

In another variant that may be envisaged, in which no such data representing the relative orientation is used, there may be provision for a reference orientation to be indicated to the user, for example by the presence of a printed arrow 1340 on one face of the microcircuit card, as shown in FIG. 3. The orientation indication supplied to the server under the control of the application A 1336 is then an indication of an orientation relative to this reference orientation. To assist the user to identify this direction when installing the microcircuit card, the application A 1336 can prompt the user to choose one of four arrows displayed on the screen 1100 that corresponds to the arrow 1340 printed on the microcircuit card 1300. On subsequent use of the application A 1336, the latter commands the display on the screen 1100 of an arrow oriented like the arrow initially selected in order for the user to visualize the direction in which they must aim at the positional entity of interest to them to obtain information concerning that positional entity. A displayed arrow 1345 of this kind is shown in dashed outline in FIG. 1.

During a step 525, the application A 1336 sends the server 4000 the geographical position PG and the angle α in an SMS message, via the Internet or via the contacts 1350 of the microprocessor 1200 and the mobile telephone network 2000, where appropriate secured by cryptographic means of the microcircuit card 1300.

During a step 530, the server 4000 looks up in the database 4100, and possibly by trigonometric calculation, at least one positional entity corresponding to the angle α and the geographical position PG; in other words, from this geographical position, the positional entity is in the direction identified by the angle α relative to north. Following the description of FIG. 4, examples are given of how the search for positional entities is effected by the server 4000.

During a step 535, the server 4000 communicates the information associated with each positional entity found in the database 4100 to the application A 1336 via the mobile telephone network 2000, the microprocessor 1200 and the contacts 1350.

The list of positional entities may be sent by the server 4000 in the form of an html page including a label list (name of the positional entity) and a URL for obtaining more information on the positional entity.

For example:

| | |
|---|---|
| Eiffel Tower | www.tour-eiffel.fr |
| Quai Branly museum | www.quaibranly.fr |
| Eiffel Tower restaurants | www.restaurants-toureiffel.com |

During a step 540, by sending a message to the microprocessor 1200, the application A 1336 commands display on the screen 1100 of some or all of the information associated with at least one of the positional entities concerned.

If the information displayed includes a link (for example a URL electronic address or a link to a database), the user may select that link to obtain additional information relating to the positional entity concerned.

Optionally, at the beginning of the step 540, if the server 4000 has found a plurality of positional entities, the application A 1336 (i.e. the processor 1330 by executing the application A 1336) may ask the user which positional entity is of interest to them (by means of a display on the screen 1100 and awaiting input from the user on the keypad 1400). As already indicated, the description hereinafter relates to a single positional entity that the user chooses in this step, for example.

During a step 545, the user can terminate execution of the application A 1336 by pressing a key of the keypad 1400 of the mobile telephone 1000 (the user may be prompted to do this by an appropriate display on the screen 1100).

If the user does not terminate execution of the application A 1336, the process returns to the step 510.

Examples of the search effected by the server 4000 during the step 530 are given hereinafter.

In a first example, the database 4100 includes the dimension at least of the street frontage of each building of interest. Alternatively, the database 4100 contains only the center of each building of interest and the search is effected with an angular tolerance. In both cases, the server 4000 retrieves and returns the information on the positional entities without searching beyond a predetermined number of frontages encountered on the line of sight, for example one frontage. More generally, the database 4100 sends back information on only the positional entity nearest the position of the electronic entity in the direction pointed to.

In a second example, the server 4000 sends back a list of positional entities within a polygon (for example a pentagon) determined by the angle α, the geographical position PG, a maximum width and a maximum length. The latter two parameters can be edited by the user and by the application A 1366.

In a third example, the application A 1366 goes from one positional entity to another in a list of positional entities corresponding to the geographical position PG and the angle α.

In a fourth example, the server 4000 sends back a list of positional entities contained in a polygon (for example a pentagon) determined by the angle α, the geographical position PG, a predetermined maximum width and a maximum distance from the mobile telephone, this maximum distance being a parameter whose value is set by the user by means of the application A 1366. The server 4000 then sends back a list of positional entities meeting those criteria. A user interface of the application A 1366, for example a button on the keypad, enables the user to go from one entity to the next in the order of the positional entities found in the direction concerned.

The foregoing embodiments of the invention are merely possible examples of implementing the invention, which is not limited to them.

Notably, the current location of the mobile telephone 1000 can be obtained by means other than the microcircuit 1300 receiving GPS signals. The position information for the microcircuit card can be supplied by the electronic entity (which then includes a signal receiver and triangulation means, for example) or the network 2000 (which then transmits the identification of the cell in which the electronic entity is situated, for example, or the powers of signals received from the electronic entity via different antennas, triangulation being effected by this network or by the server concerned).

The invention claimed is:

1. An electronic entity (1000), comprising:
   a display screen;
   means (1300, 1310, 1320) configured for obtaining an angle relative to a reference direction, said angle being representative of an orientation of the electronic entity;
   means (1300, 1330, 1350) configured for sending a request containing information on said orientation;
   means (1300, 1330, 1350) configured for receiving information relating to at least one positional entity located, from a geographical position of the electronic entity, in the direction identified by the angle; and
   means (1300, 1330, 1350, 1100) configured for providing a user with said information by displaying said information on the display screen.

2. The electronic entity according to claim 1, further comprising:
   means (1300, 1360) configured for obtaining the geographical position and for sending a request being adapted so that said request contains information on said geographical position.

3. The electronic entity according to claim 2, wherein said means (1300, 1360) configured for obtaining the geographical position include means configured for receiving positioning signals and means configured for determining geographical locations as a function of said positioning signals.

4. The electronic entity according to claim 3, wherein said means (1300, 1360) for obtaining the geographical position include means for obtaining a reference of a cell of a cellular telephone network in which the electronic entity is situated.

5. The electronic entity according to claim 2, wherein said means (1300, 1360) configured for obtaining the geographical position include means configured for obtaining a reference of a cell of a cellular telephone network in which the electronic entity is situated.

6. The electronic entity according to claim 1, wherein said means (1300, 1310, 1320) configured for obtaining the orientation of the electronic entity include a magnetometer (1310).

7. The electronic entity according to claim 1, further comprising:
   a microcircuit card (1300); and
   means (1300, 1330, 1350) configured for sending information indicating a model of the electronic entity and means (1300, 1330, 1350) configured for receiving data representing a relative orientation of the electronic entity and the microcircuit card for said model, the means configured for obtaining the orientation of the electronic entity using said relative orientation.

8. The electronic entity according to claim 1, including mobile telephone means.

9. The electronic entity according to claim 1, further comprising:
   a microcircuit card (1300); and
   means configured for accessing a SimToolKit menu of said microcircuit card and means configured for selecting in said menu an application for controlling the means configured for obtaining the orientation of the electronic entity, the means configured for sending the request, the means configured for receiving the information relating to the at least one positional entity, and the means configured for supplying the user with said information relating to the at least one positional entity.

10. The electronic entity according to claim 1, further comprising:
    a microcircuit card, the means configured for obtaining the orientation of the electronic entity being adapted to determine a relative orientation of the microcircuit card and the electronic entity on first using the microcircuit card or first launching an application for controlling said means configured for obtaining the orientation of the electronic entity, the means configured for sending the request, the means configured for receiving the information relating to at the least one positional entity, and the means configured for providing the user with said information relating to the at least one positional entity.

11. The electronic entity according to claim 1, wherein the means for providing a user with said information relating to the at least one positional entity received by the receiving means are adapted to display at least one hypertext link and to enable the user to select said link to obtain additional information relating to the at least one positional entity.

12. The electronic entity according to claim 1, wherein said at least one positional entity is a billboard, and
    wherein said received information is related to an advertisement displayed on said billboard.

13. The electronic entity according to claim 1, wherein the reference direction is north.

14. The electronic entity according to claim 1, wherein the reference direction is magnetic north.

\* \* \* \* \*